United States Patent
Hentschel

[11] 3,808,516
[45] Apr. 30, 1974

[54] ELECTRICAL LOSS-DEPENDENT THERMAL SIMULATOR CIRCUIT OF AN ELECTRICAL OPERATING MEANS SUCH AS ELECTRIC MOTORS AND TRANSFORMERS

[75] Inventor: Michael Hentschel, Hannover, Germany

[73] Assignee: Sprecher & Schuh AG, Aarau, Switzerland

[22] Filed: May 11, 1973

[21] Appl. No.: 360,377

[30] Foreign Application Priority Data
Aug. 22, 1972 Switzerland................. 12429/72

[52] U.S. Cl.............. 323/68, 318/471, 324/158 R, 323/100
[51] Int. Cl. ................................................ G05b 17/00
[58] Field of Search................. 318/334, 471–473; 324/158 R, 158 MG; 323/68, 69, 100; 235/151.31; 340/410

[56] References Cited
UNITED STATES PATENTS

| | | |
|---|---|---|
| 3,325,723 | 6/1967 | Grayson........................ 324/158 R |
| 3,435,328 | 3/1969 | Allen.......................... 324/158 R X |
| 3,517,303 | 6/1970 | Julie.................................. 323/100 |
| 3,622,849 | 11/1971 | Kelley, Jr. et al................. 323/69 X |

*Primary Examiner*—Gerald Goldberg
*Attorney, Agent, or Firm*—Eric H. Waters

[57] ABSTRACT

An electrical loss-dependent thermal simulation or simulator circuit of an electrical operating device, the circuit incorporating at least two RC-elements, by means of the capacitors and resistors of which there are determined the thermal capacity of the operating means and its heat transfer resistance. The resistors of the RC-element are electrically connected together into a two-pole resistance network and by means of the charging operation of the capacitors there is simulated the heating behavior of the operating device. There is provided switch circuit which can be connected by a switch mechanism with the resistance network, such switch means increasing the virtual impedance of the resistance network, and further wherein the RC-elements can be switched, by actuating the switch mechanism, from a predetermined time-constant, with switched-off switch means, to a larger time-constant, with switched-on switch means, and vice versa.

7 Claims, 5 Drawing Figures

ELECTRICAL LOSS-DEPENDENT THERMAL SIMULATOR CIRCUIT OF AN ELECTRICAL OPERATING MEANS SUCH AS ELECTRIC MOTORS AND TRANSFORMERS

BACKGROUND OF THE INVENTION

The present invention concerns an electrical loss-dependent thermal simulation circuit or simulator of an electrical operating means, which simulation circuit comprises at least two RC-elements, by means of the capacitors and resistors of which there can be determined the thermal capacity of the operating means and the heat transfer resistance, respectively, and wherein the resistors of the RC-element are electrically connected into a two-pole resistance network and through the charging of the capacitors there is simulated the heating behavior of the operating means.

Such type thermal simulators are particularly employed as control elements in protective devices for electrical operating means wherein components, such as for instance windings, can impermissibly heat-up due to power losses. Generally, the capacitors of the simulation circuit are charged by a charging current, the intensity of which is a function of the losses of the operating means, and usually proportional to the square of the operating current intensity. In order to obtain a control signal, the charging voltage of the capacitors is compared with a comparison voltage characteristic of the permissible boundary temperature. Long response times, such as for instance may be present in the order of two hours and more in the case of three-phase motors operating at rated load and slight overload, require simulators with correspondingly large time-constants which in practice can be primarily realized by using extremely high-ohm resistors. Since when using extremely high-ohm resistors, for instance during generation of a charging current for the simulator, difficulties can arise, it has already been proposed to deliver in a cycled or clocked fashion the charging current to the simulator and to tap the charging voltage in a clocked fashion from the capacitors. For clocking purposes there can be employed an electronic switch which is arranged ahead of the RC-elements of the simulator, resulting in a circuit arrangement which with respect to the outside, is relatively low-ohmic. Simulators of this type function satisfactorily during continuous operation of the operating means. With irregular and particularly intermittent operation, there however occur frequent defects, so that the protection device tends to respond prematurely or too late and the operation is disturbed or the protection of the operating means against overheating is no longer positively insured. These drawbacks are attributable to the variable heating behavior of the operating means during both operating conditions, for instance when the motor is stationary and running, and the occurrence thereof has its effect in terms of the simulator no longer being accommodated to the heating behavior of the operating means during the prevailing operating conditions.

SUMMARY OF THE INVENTION

Hence, it is a primary object of the present invention to provide an improved electrical loss-dependent thermal simulator of an electrical operating means which is no longer associated with the aforementioend drawbacks and limitations of the prior art proposals.

Another and more specific object of the present invention is directed to a thermal simulator circuit having at least two RC-elements, and which following accommodation of the heating behavior of the operating means also satisfactorily reproduces the heating behavior of the operating means even during irregular and intermittent operation so as to attain satisfactory protection of the operating means.

Now in order to implement these and still further objects of the invention, which will become more readily apparent as the description proceeds, the thermal simulator or simulation circuit is manifested by the features that there is provided a switch means which can be connected to the aforementioned resistance network by a switch mechanism, said switch means increasing the virtual impedance of the resistance network, the RC-elements, upon actuating the switch mechanism, being switched from a predetermined time-constant, with the switch means switched-off, to a larger time-constant, with the switch means switched-on, and vice versa.

By switching-on the aforementioend switch means, the virtual impedance of the resistance network and therefore the time-constants of the simulator, are set to a greater value without having to undertake any changes or manipulations at the RC-elements, so that the RC-elements are very high-ohmic and, if desired in conjunction with an electronic switch, for instance a field-effect transistor, for the clocked infeed of the charging time, can be cast or molded into a block to protect against moisture, whereby the danger of formation of leakage currents is extensively reduced and there is insured for precise functioning of the simulator. As the switch mechanism there can be employed a controllable electronic switch, especially a semiconductor element, such as for instance a field-effect transistor, which for turning-on and turning-off the switch means can be controlled by control signals which indicate the momentary operational condition of the operating means. To increase the virtual impedance of the resistance network, there can be employed a negative resistance circuit or arrangement which is connected parallel to the resistance network by means of the switch mechanism. A particularly suitable negative resistance circuit contains an operational amplifier, the non-inverting input of which is coupled with a first terminal of the resistance network and by means of a resistor, which may be an adjustable resistor, as well as by means of the switching path of the switch mechanism, is coupled with the output of the operational amplifier, and the inverting input of which is connected via a resistor with the output of the operational amplifier and via a further resistor with the last terminal of the resistance network. If both of the resistors which are connected to the inverting input of the operational amplifier are the same, then the negative resistance is determined by the resistance value of the resistor connected at the non-inverting input.

Instead of using a negative resistance arrangement, it is possible to also advantageously employ an impedance converter, the input of which is connected with the first terminal of the resistance network and with which there is connected the capacitor associated with the first resistor, in order to obtain an output voltage which is proportional, preferably equal to the charging voltage of the capacitor. At the output of the impedance converter, there is connected a voltage divider, by means of which there is applied at the last terminal of the resistance network, a fraction of the output voltage of the impedance converter, whereby there is increased the virtual impedance of the resistance network corresponding to the partial ratio or relationship of the tapped-off voltage with respect to the charging voltage of the capacitor. Owing to the low-ohm output circuit of the impedance converter, there can be employed as the voltage divider a potentiometer, so that the increase of the virtual impedance of the resistance network and therefore the prolongation factor for the time-constant of the simulator, can be randomly adjusted and the simulator can be accommodated with its larger time-constant exactly to the heating behavior of the operating means. The low-time constant of the simulator, that is to say, the time-constant with the impedance converter turned-off, is determined by the RC-elements. At least at the first RC-element there can be applied at the base point of the capacitor a fraction of the output voltage of the impedance converter, by means of which the capacitance of the capacitor of this RC-element is reduced virtually in accordance with the partial relationship of the tapped-off voltage to the charging voltage of the capacitor, so that the time-constant of such RC-element can be varied by changing the partial ratio or relationship and also the low-time constant of the simulator circuit can be accommodated to the momentary employed or relevant operating means.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
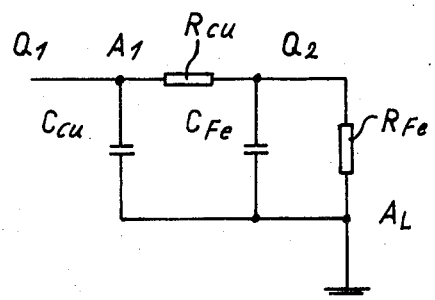
FIG. 1 is a simplified circuit diagram of a thermal simulator equipped with two RC-elements for an electric motor.

Describing now the drawings, the simplified construction of thermal simulator or simulation circuit of an electric motor, as is known, consists of two RC-elements (FIG. 1), wherein by means of the capacitor $C_{Cu}$ of the first RC-element there is simulated the thermal or heat capacity of the motor windings and by means of the resistor $R_{Cu}$ of such RC-element there is simulated the heat transfer resistance from the windings to the motor stator and further by means of the capacitor $C_{Fe}$ of the second RC-element there is simulated the thermal capacity of the motor stator and by means of the resistor $R_{Fe}$ there is simulated the heat transfer resistance from the motor stator to cooling means, these simulations being of course approximations. The resistors $R_{Cu}$ and $R_{Fe}$ are connected in series and the capacitors $C_{Cu}$ and $C_{Fe}$ are charged with a charging current from a controlled charging current source $Q_1$, which is usually proportional to the square of the motor current. This charging current source $Q_1$ is connected with the connection or junction point of the capacitor and resistor of the first RC-element, that is to say, the first terminal $A_1$ of the resistance network of both RC-elements. At the other or last terminal, $A_L$ of the two terminal resistance network, there is applied null potential of a stabilized reference voltage.

Figure 2:
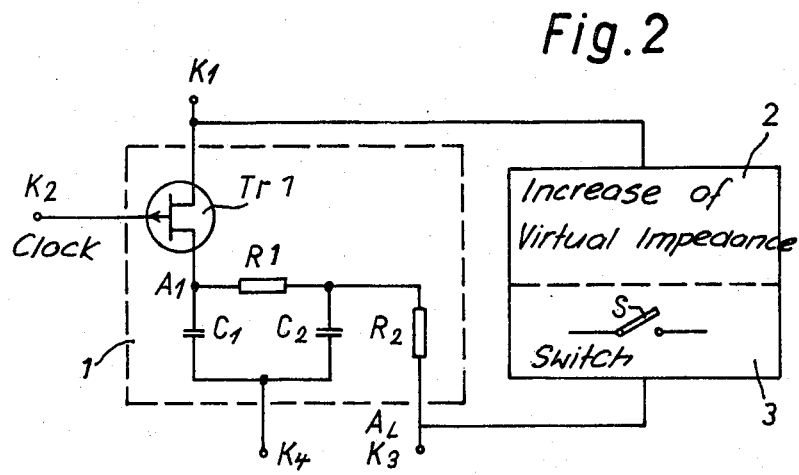
FIG. 2 is a block circuit diagram of the inventive thermal simulator or simulation circuit of an electric motor.

By means of the first RC-element $R_{Cu}$, $C_{Cu}$, there is approximately taken into consideration the thermal behavior of the stator windings of the motor and by means of the second RC-element $R_{Fe}$, $C_{Fe}$ there is approximately taken into account the behavior of the stator iron of the motor. At the terminal or junction point of the second RC-element $R_{Fe}$, $C_{Fe}$, there can be assumed an equivalent current source $Q_2$, the impressed or load-independent of which, under the preconditions that, there do not occur any fequency fluctuations, the changes in rotational speed of the motor are slight, and the supply voltage of the motor is approximately constant, can be considered to be constant. Owing to the long response times for a motor operated at rated load or slight overload, the simulator circuit is very high-ohmic. The charging current is advantageously delivered in a timed or clocked fashion to the simulator, so that the effective charging current, by means of which the capacitors of the simulator are charged, is equal to the product of the charging current intensity of the current source $Q_1$ and the clock ratio (duration of work time to duration of rest time), and the charging current source $Q_1$ with a clock ratio less than 1 can deliver a correspondingly higher charging current, which can be more easily controlled. For clocking purposes there can be used an electronic switch element Tr 1 (FIG. 2), for instance a field-effect transistor. Since such type high-ohmic circuits are very sensitive to leakage currents, and as indicated in FIG. 2, the RC-elements $R_1$, $C_1$ and $R_2$, $C_2$, are molded together with the electronic switch Tr 1 into a block 1 to protect against moisture, and at which block 1 there are provided the external connection terminals. In particular, for the embodiment of FIG. 2 there are provided a connection terminal $K_1$ for connecting the controlled charging current source, a connection terminal $K_2$ connected with the control electrode of the electronic switch element Tr 1 and serving for connecting a clock generator, a terminal $K_3$ connected with the free end of the resistor $R_2$ of the second (last) RC-element, and which terminal $K_3$ forms the last terminal $A_L$ of the resistance network, in the case under consideration the resistance chain $R_1$, $R_2$, and a terminal $K_4$ at which there can be connected both of the capacitors $C_1$ and $C_2$ and which forms the bottom end or base point thereof. In this way there is obtained a four-terminal network which with respect to the outside, constitutes a relatively low-ohmic and therefore non-critical circuit arrangement, however does not allow any changes or adjustments to reach the circuit components.

With regard to the thermal behavior of the motor, the time-constants are different when the motor is at standstill and running, and specifically primarily owing to the different cooling behavior. For an exact simulation of the heating behavior, it is accordingly necessary that the primary time-constant, with the motor stationary, and which takes into account the thermal behavior of the stator iron, must be greater than when the motor is running. The larger time-constant is obtained by switch means 2 for increasing the virtual impedance of the resistance network $R_1$, $R_2$, which, when the simulator should have higher time-constant, is connected via the connection terminals $K_1$ and $K_3$ with the resistance network $R_1$, $R_3$. For switching from a lower to a higher time-constant, and vice versa, there is provided a switch mechanism 3 which, when assuming one of its switch positions, renders effectual the switch means 2 for increasing the virtual impedance and when assuming the other switch position renders such switch means 2 ineffectual.

Figure 3:
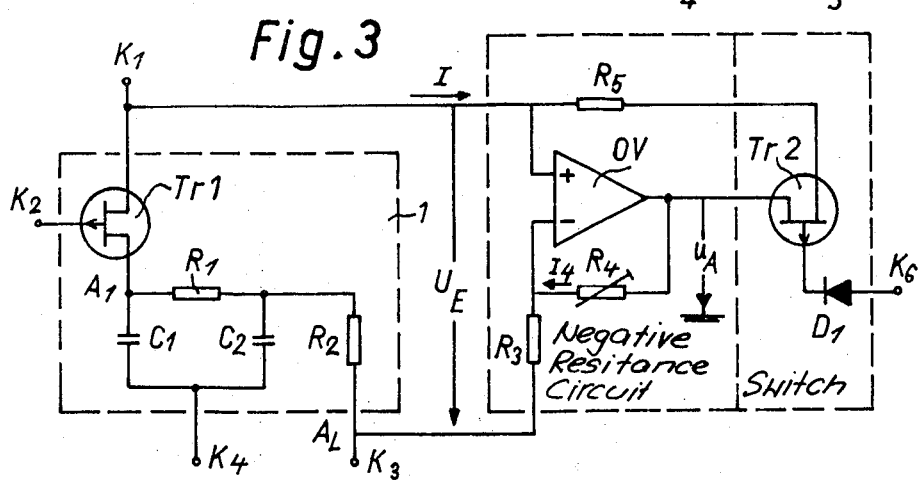
FIG. 3 is a circuit diagram of the exemplary embodiment of thermal simulator depicted in FIG. 2 with a negative resistance arrangement as the switch means for increasing the virtual impedance of the resistance network or both RC-elements.

With the exemplary embodiment depicted in FIG. 3, the switch means 2 for increasing the virtual impedance consists of a negative resistance circuit or arrangement 4, which in the illustrated exemplary embodiment contains an operational amplifier OV. The non-inverting input of the operational amplifier OV is connected to the terminal $K_1$ and the inverting input thereof is connected via a resistor $R_3$ with the terminal $K_3$ of the block 1. The output of the operational amplifier OV is connected via the source-drain path of a field-effect transistor Tr 2 serving as the switch mechanism 3 and a resistor $R_5$ with the non-inverting input as well as also via a resistor $R_4$ with the inverting input. Now if by means of reference character U there is designated the input voltage between the connections at the terminals $K_1$ and $K_3$ and by means of reference character I the current, then the resistance of such circuit arrangement can be expressed by the following equation:

$$U_E/I = - R_3 \cdot R_5/R_4.$$

$$\tag{1}$$

To derive this equation, there is assumed that the non-inverting input of the operational amplifier OV is connected with null potential and the switch is closed. The current flowing through the resistor $R_4$ is designated by reference character $I_4$ and is defined by the following equation:

$$I_4 = U_E/R_3.$$

$$\tag{2}$$

From the output voltage $U_A$ of the operational amplifier OV, the current $I_4$ which appears between its output and null potential can be expressed by the following equation:

$$I_4 = U_A/R_4.$$

$$\tag{3}$$

From both of the equations for $I_4$ there can be expressed the output voltage $U_A$ by the equation:

$$U_A = U_E R_4/R_3$$

$$\tag{4}$$

And by means of the voltage drop at the resistor $R_5$ there can be derived the equation:

$$U_A + I R_5 = 0.$$

$$\tag{5}$$

From both of the last equations concerning $U_A$ there is possible to finally obtain the equation (1) for the resistance of the circuit arrangement.

Now if the resistance values of the resistors $R_3$ and $R_4$ are equal, then $$U_E/I = -R_5, \text{ when } R_4 = R_3$$

$$\tag{6}$$

The resistor $R_4$ is advantageously continuously or step-wise adjustable, so that by varying the impedance increase the required time-constant can be accommodated to the relevant device.

The field-effect transistor Tr 2 is controlled by a control voltage which is applied through the agency of a diode $D_1$ at its gate electrode. This control voltage, with the motor at standstill, possesses such an amplitude that the field-effect transistor Tr 2 is placed into its conductive state and, on the other hand, when the motor is running, is blocked. The control voltage can be obtained by comparison of a voltage proportional to the motor current with a comparison voltage.

Figure 4:
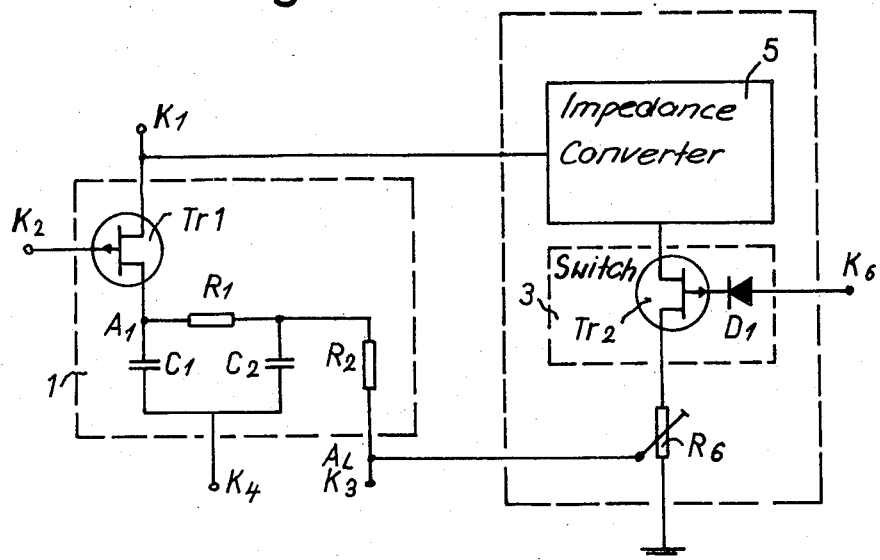
FIG. 4 is a circuit diagram for the exemplary embodiment of thermal simulator depicted in FIG. 2 with an impedance converter for increasing the virtual impedance of the resistance network.

In the embodiment of FIG. 4, there is provided for the purpose of increasing the virtual impedance of the resistance network $R_1$, $R_2$, an impedance converter 5. The input of this impedance converter 5 is connected with the terminal $K_1$ of the circuit block 1 and the output thereof is connected via the source-drain path of the field-effect transistor Tr 2 and a voltage divider $R_6$, for instance at null potential. The output voltage of the impedance converter is proportional to or equal to the voltage at the point $A_1$ of the capacitor $C_1$ of the first RC-element. The tap of the voltage divider $R_6$ is connected with the terminal $K_3$ of the circuit block 1, that is to say, at the last terminal or connection $A_L$ of the resistance network $R_1$, $R_2$, so that there always appears thereat a certain fraction or proportion of the charging voltage of the capacitor $C_1$. With slight change in the charging state as a function of time, and as already previously mentioned, the voltage drop at the resistor $R_1$ is negligible and need not be considered, so that the voltage at the capacitor $C_2$ is approximately equal to the voltage at the capacitor $C_1$. By applying a fraction of the output voltage of the impedance converter 5 at the terminal $A_L$, that is to say, at the bottom end or base point of the resistor $R_2$, there is realized a virtual increase in the leakage resistance and therefore an increase in the primary time-constant, by means of which there is taken into account the thermal behavior of the stator iron of the motor. The increase of the virtual resistance in this case is determined by the partial ratio of the tapped-off voltage to the charging voltage of the capacitor $C_1$ and, when the impedance converter delivers an output voltage which is exactly equal to the charging voltage of the capacitor $C_1$, the time-constant is prolonged by a factor which is determined by the partial ratio $f$ of the voltage divider $R_6$. The prolongation factor F can be expressed by the equation:

$$F = 1/1 - f$$

$$\tag{7}$$

wherein reference character $f$ constitutes the partial ratio of the voltage divider $R_6$. The time-constant can thus be prolonged at a maximum to infinity. The use of an impedance converter allows for the realization of circuits of particularly simple construction.

Since the heating behavior is different for the individual types of motors, it is of advantage for a motor simulation or simulator circuit if both the primary-time constant (stator iron) as well as the auxiliary time-constant (stator winding) can be randomly adjusted within certain limits. Since the simulator is supplied by an impressed current, the ohmic resistances must remain constant during variation of the time-constants. A change in the time constants of a RC-element can be attained by a virtual reduction in the capacitance of the capacitor in that the bottom end or base point of the capacitor is applied to a fraction of the capacitor-charging voltage, wherein for the time-constant there is significant the voltage between the head point of the capacitor and a reference potential, for instance null potential, which has been designated by reference character $U_A$. If the base point of the capacitor is not connected with null-potential, rather there is applied thereto a fraction of the voltage $U_A$ which is determined by the partial ratio $f$, then the capacitor voltage $U_A$ related to the null-potential can be expressed by the equation $$U_A = f \cdot U_A + U_C \qquad (8)$$

wherein reference character $U_C$ designates the voltage across the capacitor linings or coatings. The voltage $U_C$ across the capacitor linings can be expressed by the equation $$U_C = U_A \cdot (1 - f). \qquad (9)$$

From the basic equation (capacitance equals charge divided by voltage) the charge Q of the capacitor can be expressed by the equation $$Q = C \cdot U_C \qquad (10)$$

and with respect to the capacitor voltage $U_A$ related to the null potential, there can be assumed a virtual capacitance $C_V$, which is equal to $$C_V = Q/U_A = C \cdot U_C/U_A \qquad (11)$$

that is to say, that $$C_V = C (1 - f). \qquad (12)$$

Figure 5:
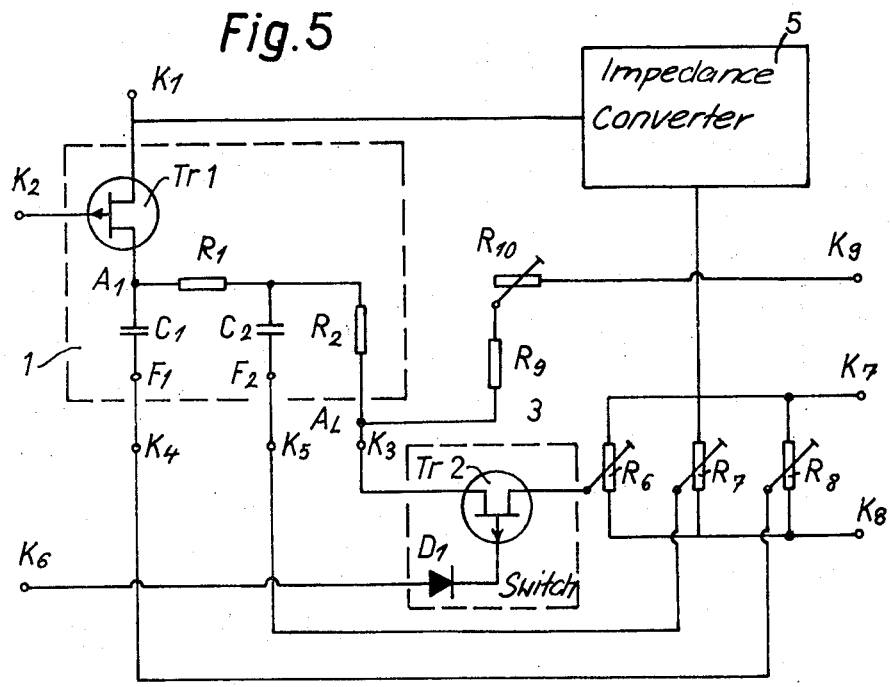
FIG. 5 is a circuit diagram of the embodiment of thermal simulator depicted in FIG. 4, wherein the time-constants of the individual RC-elements can be varied.

With the exemplary embodiment depicted in FIG. 5 there is realized this change of the virtual capacitance to the variation of the time-constants of both RC-elements $R_1$, $C_1$ and $R_2$, $C_2$. The bottom ends or base points $F_1$ and $F_2$ of both RC-element capacitors $C_1$ and $C_2$ are separately conducted out of the cast circuit block 1 and connected with the terminals $K_4$ and $K_5$. At the output of the impedance converter 5 there are connected three parallelly connected variable voltage dividers $R_6$, $R_7$ and $R_8$. From the output terminals $K_7$, $K_8$ of such voltage dividers there can be tapped the voltage $U_A$, that is to say, there can be tapped-off and indicated the capacitor voltage of capacitor $C_1$ which is related to the reference potential. The one voltage divider $R_6$ serves, as explained in conjunction with the embodiment of FIG. 5, for adjusting the prolongation factor for the time-constant of the simulator circuit and its center tap is connected via the source-drain path of the field-effect transistor Tr 2 and the connection terminal $K_3$ with the terminal $A_L$ of the resistor $R_2$. The connection terminal $K_3$ is additionally coupled via a resistor $R_9$ and a variable resistor $R_{10}$ with a connection terminal 9, at which there can be applied a reference voltage in order to be able to take into account the losses at the stator iron. This reference voltage is switched-off when the motor is not under voltage. The gate electrode of the field-effect transistor Tr 2 is connected via a diode $D_1$ with terminal $K_6$ at which there can be connected a signal transmitter for controlling the field-effect transistor. The second voltage divider $R_7$ serves to vary the primary time-constants (stator iron), that is to say, the time-constants of the RC-element $R_2$, $C_2$. Its tap is connected with the terminal $K_5$, so that the tapped-off voltage appears at the bottom end or base point $F_2$ of the capacitor $C_2$. The third voltage divider $R_8$ serves to vary the auxiliary time-constants (stator windings) and its tap is connected to the terminal $K_4$ coupled with the capacitor $C_1$. By means of such simulator circuit, which in construction is very simple, it is possible to optimumly simulate the heating behavior of any given random motor both during continuous as well as intermittent operation, wherein there is only necessary an adjustment of the voltage dividers $R_6$, $R_7$, $R_8$. The use of the systems herein disclosed is of course not limited to simply electric motors. For instance in the case of transformers, similar conditions arise, so that there can be employed in the protective devices thereof advantageously one of the previously described simulators or simulation circuits.

While there is shown and described present preferred embodiments of the invention, it is to be distinctly understood that the invention is not limited thereto, but may be otherwise variously embodied and practiced within the scope of the following claims. Accordingly,

What is claimed is:

1. An electrical loss dependent-thermal simulator circuit for an electrical operation means, comprising at least two RC-elements, by means of the capacitors and resistors of which it is possible to determine the thermal capacity of the operating means and the heat transfer resistance, the resistors of said RC-element being coupled together to provide a two-terminal resistance network, and wherein charging of the capacitors simulates the heating behavior of the operating means, switch means for increasing the virtual impedance of the resistance network, a switch mechanism for connecting the switch means with said resistance network, and wherein said RC-elements, through actuation of said switch mechanism, can be switched from a certain time-constant with the switch means switched-off, to a greater time-constant with the switch means switched-on, and vice versa.

2. The thermal simulator circuit as defined in claim 1, wherein said switch means includes negative resistance means for increasing the virtual impedance of the resistance network, said negative resistance means being connected in parallel with said resistance network by means of said switch mechanism.

3. The thermal simulator circuit as defined in claim 2, wherein said negative resistance means comprises an operational amplifier having a non-inverting input, an inverting input and an output, the non-inverting input of said operational amplifier being connected with a first terminal of the resistance network and via a resistor and through the agency of the switching path of the switching mechanism with the output of the operational amplifier, and the inverting input of the operational amplifier being connected via a resistor with the output of the operational amplifier and via a further resistor with the other terminal of the resistance network.

4. The thermal simulator circuit as defined in claim 1, wherein said switch means includes an impedance converter for increasing the virtual impedance of the resistance network, said impedance converter having an input coupled with a first terminal of the resistance network and with which there is connected the capacitor associated with the resistor of a first of said two RC-elements in order to obtain an output voltage which is proportional or equal to the charging voltage of the capacitor, a voltage divider for applying a fraction of the output voltage of the impedance converter to the other terminal of the resistance network, wherein the virtual increase in the impedance of the resistance network is determined by the partial ratio of the tapped-off voltage to the charging voltage of said capacitor.

5. The thermal simulator circuit as defined in claim 4, further including a voltage divider for applying at least for the first RC-element at the base point of its capacitor a fraction of the output voltage of the impedance converter, so that the capacitance of the capacitor of the first RC-element is correspondingly reduced virtually with regard to the partial ratio of the voltage divider, and by adjusting the partial ratio at the voltage divider connected with the capacitor of said first RC-element there can be changed the time-constant of such RC-element.

6. The thermal simulator circuit as defined in claim 1, further including an electronically controlled switch connected with one of said RC-elements, and wherein said one RC-element and the electronically controlled switch constitute a molded block to protect against leakage currents brought about by moisture.

7. The thermal simulator circuit as defined in claim 1, wherein the switch mechanism comprises a controllable electronic switch which is controlled by control signals indicating the momentary operating condition of the operating means for switching-on and switching-off the switch means fo increasing the virtual impedance of the resistance network.

* * * * *